United States Patent
de Oliveira et al.

(10) Patent No.: US 10,553,121 B1
(45) Date of Patent: Feb. 4, 2020

(54) DETECTING VIOLATION OF AIRCRAFT SEPARATION REQUIREMENTS

(71) Applicants: The Boeing Company, Chicago, IL (US); The University of Brasilia, Brasilia (BR)

(72) Inventors: Italo Romani de Oliveira, São José dos Campos (BR); Vitor Filincowsky Ribeiro, Brasilia (BR); Li Weigang, Brasilia (BR); Reinaldo Crispiniano Garcia, Brasilia (BR)

(73) Assignees: THE BOEING COMPANY, Chicago, IL (US); THE UNIVERSITY OF BRASILIA, Brasilia (BR)

(*) Notice: Subject to any disclaimer, the term of this patent is extended or adjusted under 35 U.S.C. 154(b) by 0 days.

(21) Appl. No.: 16/132,792

(22) Filed: Sep. 17, 2018

(51) Int. Cl.
*G08G 5/00* (2006.01)
*G06F 16/31* (2019.01)
(Continued)

(52) U.S. Cl.
CPC ......... *G08G 5/0026* (2013.01); *G06F 16/316* (2019.01); *G08G 5/006* (2013.01);
(Continued)

(58) Field of Classification Search
CPC ...... G08G 5/045; G08G 5/003; G08G 5/0026; G08G 5/0039; G08G 5/0034; G08G 5/0013; G08G 5/0052; G08G 5/0078; G08G 5/0091; G08G 5/04; G08G 5/0008; G08G 5/006; G08G 5/025; G08G 5/0043; G08G 5/0082; G08G 5/0021; G05D 1/06; G05D 1/0676; G05D 1/0202; G05D 1/0005; G05D 1/101; G06Q 10/04; G06Q 10/047; G06Q 10/06; G06Q 50/30; G01S 5/0009;
(Continued)

(56) References Cited

U.S. PATENT DOCUMENTS

| | | | |
|---|---|---|---|
| 7,702,427 B1 * | 4/2010 | Sridhar | G08G 5/045 701/14 |
| 9,536,435 B1 * | 1/2017 | Shay | G08G 5/045 |

(Continued)

*Primary Examiner* — Behrang Badii
(74) *Attorney, Agent, or Firm* — Coats & Bennett, PLLC

(57) ABSTRACT

A computing system obtains flight information comprising a plurality of waypoints for each of a plurality of aircraft flight paths, and detects a violation of aircraft separation requirements at a given time instance. Each waypoint specifies an altitude, a longitudinal position, a latitudinal position, a velocity, and a time instance. Detecting the violation comprises selecting a set of time-correlated waypoints from the flight information, each time-correlated waypoint specifying the given time instance. The detecting further comprises selecting a set of altitude-correlated waypoints from the set of time-correlated waypoints, each of the altitude-correlated waypoints being vertically-separated from at least one other altitude-correlated waypoint by less than a threshold vertical separation. The detecting further comprises determining that first and second position-correlated waypoints from the set of altitude-correlated waypoints are vertically-separated from each other by less than the threshold vertical separation and horizontally-separated from each other by less than a threshold horizontal separation.

20 Claims, 8 Drawing Sheets

(51) Int. Cl.
  *G05D 1/06* (2006.01)
  *G08G 5/04* (2006.01)
  *G06G 7/70* (2006.01)
  *G06Q 10/04* (2012.01)

(52) U.S. Cl.
  CPC ......... *G08G 5/0013* (2013.01); *G08G 5/0034* (2013.01); *G08G 5/0039* (2013.01); *G05D 1/06* (2013.01); *G05D 1/0676* (2013.01); *G06G 7/70* (2013.01); *G06Q 10/047* (2013.01); *G08G 5/00* (2013.01); *G08G 5/003* (2013.01); *G08G 5/04* (2013.01)

(58) Field of Classification Search
  CPC .......... G01S 19/14; G01C 21/20; G01W 1/00; G06G 7/70
  See application file for complete search history.

(56) References Cited

U.S. PATENT DOCUMENTS

| | | | |
|---|---|---|---|
| 10,380,901 B2 * | 8/2019 | Deker | |
| 2003/0132860 A1 * | 7/2003 | Feyereisen | G01C 23/00 340/973 |
| 2003/0222887 A1 * | 12/2003 | Wilkins, Jr. | G01C 23/005 345/618 |
| 2009/0112535 A1 * | 4/2009 | Phillips | G06Q 10/04 703/2 |
| 2013/0131970 A1 * | 5/2013 | Pendry | G08G 5/0034 701/120 |
| 2016/0163201 A1 * | 6/2016 | Le Merrer | G08G 5/003 701/4 |

\* cited by examiner

CREATE KEYSPACE IF NOT EXISTS kp_traptest WITH replication = { 'class': 'SimpleStrategy', 'replication_factor' : 1};

FIG. 4A

CREATE TABLE IF NOT EXISTS flightPlan (
    adep text,
    flightNum text,
    acType text,
    dest text,
    opDays text,
    eobt time,
    eet time,
    velocity int,
    flightLevel int,
    route text,
    obs text,
    PRIMARY KEY (adep, flightNum));
CREATE INDEX ON flightPlan (flightNum);

FIG. 4B

CREATE TABLE IF NOT EXISTS acTrajectory (
    flightNum text,
    time time,
    altitude double,
    latitude double,
    longitude double,
    PRIMARY KEY (flightNum, time))
    WITH CLUSTERING ORDER BY (time ASC);

FIG. 4C

```
CREATE TABLE IF NOT EXISTS pointsByTime (
        hour int;
        minute int,
        time time,
        altitude float,
        latitude float,
        longitude float,
        flightNum text,
        PRIMARY KEY ((hour, minute), time, altitude));
```

FIG. 4D

```
CREATE TABLE IF NOT EXISTS waypoints (
        name text PRIMARY KEY,
        latitude float,
        longitude float);
```

FIG. 4E

```
CREATE TABLE IF NOT EXISTS airports (
        id text PRIMARY KEY,
        name text,
        latitude float,
        longitude float
        elevation int);
```

FIG. 4F

```
CREATE TABLE IF NOT EXISTS runways (
        airportID text,
        name text,
        length int,
        width int,
        lengthStrip int,
        widthStrip int,
        latitude float,
        longitude float,
        trueBearing text,
        PRIMARY KEY (airportId, name)));
```

FIG. 4G

```
CREATE TABLE IF NOT EXISTS sids (
        airportID text,
        waypointSeq int,
        waypointName text,
        latitude float,
        longitude float,
        PRIMARY KEY (airportId, waypointSeq));
```

FIG. 4H

```
CREATE TABLE IF NOT EXISTS conflicts (
        flightNum text,
        interceptorId text,
        time time,
        altitude double,
        latitude double,
        longitude double,
        flightPhase text,
        elapsedTime time,
        remainingTime time,
        direction double,
        score double,
        PRIMARY KEY (flightNum, interceptorID));
```

FIG. 4I

DETECTING VIOLATION OF AIRCRAFT SEPARATION REQUIREMENTS

TECHNOLOGICAL FIELD

The present disclosure relates generally to the field of Air Traffic Management (ATM). More specifically the present disclosure relates to the field of detecting a violation of aircraft separation requirements with computational efficiency.

BACKGROUND

Air Traffic Control (ATC) historically operates using a system of ATC clearances in order to ensure proper separation between aircraft during flights. Such an approach may require significant manual resources operating in real time to observe flights and to monitor for encroachments on separation requirements for the relevant airspace (e.g., as specified by certain regulatory bodies). These legacy ATC approaches also require significant communication between ATC and pilots to authorize or deny clearance to airspace, and to route aircraft in real time. A more modern approach may include Trajectory Based Operations (TBO), which uses aircraft trajectory and flight information for decision-making. TBO generally aims to integrate an aircraft's navigation capability in space and time to improve efficiency and predictability in the Air Traffic Management (ATM) system. However, TBO is often computationally taxing, particularly when a large number of four dimensional (4D) trajectories must be considered for conflict avoidance.

SUMMARY

Aspects of the present disclosure are generally directed to the field of ATC, and particularly relate to detecting a violation of aircraft separation requirements in a manner that is computationally efficient. For example, an iterative approach to selecting multi-dimensional waypoints from the totality of waypoints available to an ATC system and evaluating the waypoints according to respective criteria at each iteration to detect an airspace conflict may reduce the total complexity of the overall conflict detection problem, and thereby improve the efficiency of an ATC computing system. The aspects discussed herein include appropriate methods, computing devices, computer programs, systems, networks, and/or non-transitory computer readable mediums.

Aspects of the present disclosure include a method of detecting a violation of aircraft separation requirements implemented by a computing system. The method comprises obtaining flight information comprising a plurality of waypoints for each of a plurality of aircraft flight paths. Each waypoint specifies an altitude, a longitudinal position, a latitudinal position, a velocity, and a time instance. The method further comprises detecting the violation of aircraft separation requirements at a given time instance. The detecting comprises selecting a set of time-correlated waypoints from the flight information. Each time-correlated waypoint specifies the given time instance. The detecting further comprises selecting a set of altitude-correlated waypoints from the set of time-correlated waypoints. Each of the altitude-correlated waypoints is vertically-separated from at least one other altitude-correlated waypoint by less than a threshold vertical separation. The detecting further comprises determining that first and second position-correlated waypoints from the set of altitude-correlated waypoints are vertically-separated from each other by less than the threshold vertical separation and horizontally-separated from each other by less than a threshold horizontal separation.

In some aspects, the set of time-correlated waypoints is one of a plurality of time-correlated waypoint sets, and each of the time-correlated waypoint sets corresponds to one of the time instances specified by one or more of the waypoints in the flight information. In some such aspects, the method further comprises iteratively evaluating the time-correlated waypoint sets in chronological order at least until the violation of aircraft separation requirements at the given time instance is detected.

In some aspects, obtaining the flight information comprising the plurality of waypoints for each of the plurality of aircraft flight paths comprises predicting flight trajectories from the aircraft flight paths to determine the waypoints of each of the aircraft flight paths.

In some aspects, obtaining the flight information comprising the plurality of waypoints for each of the plurality of aircraft flight paths comprises generating one or more Extensible Markup Language (XML) documents comprising departure locations, departure times, and destination locations of the aircraft flight paths. Obtaining the flight information further comprises generating one or more Aircraft Intent Description Language (AIDL) documents based on the one or more XML documents. The one or more AIDL documents comprise trajectories of the aircraft flight paths. Obtaining the flight information further comprises generating the plurality of waypoints from the trajectories in the one or more AIDL documents. In some such aspects, the one or more XML documents further comprise initial aircraft masses, initial speeds, and cruising altitudes of the aircraft flight paths.

In some aspects, the method further comprises storing the plurality of waypoints for each of the plurality of aircraft flight paths in a non-relational database and querying the database to select the set of time-correlated waypoints from the flight information; and select the set of altitude-correlated waypoints from the set of time-correlated waypoints. In some such aspects, storing the plurality of waypoints for each of the plurality of aircraft flight paths in the non-relational database comprises storing the plurality of waypoints in the non-relational database in chronological order.

In some aspects, the threshold vertical separation and threshold horizontal separation are in accordance with Air Traffic Control regulations corresponding to an airspace sector that comprises the first and second position-correlated waypoints.

In some aspects, the method further comprises generating a new flight plan to replace the aircraft flight plan corresponding to the first position-correlated waypoint or the second position-correlated waypoint; or generating new flight plans to replace each of the aircraft flight plans corresponding to the first and second position-correlated waypoints.

Other aspects include a computing system for detecting a violation of aircraft separation requirements. The computing system comprises interface circuitry and processing circuitry. The processing circuitry is communicatively coupled to the interface circuitry and configured to obtain flight information comprising a plurality of waypoints for each of a plurality of aircraft flight paths via the interface circuitry. Each waypoint specifies an altitude, a longitudinal position, a latitudinal position, a velocity, and a time instance. The processing circuitry is further configured to detect the violation of aircraft separation requirements at a given time instance. To detect the violation of aircraft separation requirements, the processing circuitry is configured to select a set of time-correlated waypoints from the flight information. Each time-correlated waypoint specifies the given time instance. To detect the violation of aircraft separation requirements, the processing circuitry is further configured to select a set of altitude-correlated waypoints from the set of time-correlated waypoints. Each of the altitude-correlated waypoints is vertically-separated from at least one other altitude-correlated waypoint by less than a threshold vertical separation. To detect the violation of aircraft separation requirements, the processing circuitry is further configured to determine that first and second position-correlated waypoints from the set of altitude-correlated waypoints are vertically-separated from each other by less than the threshold vertical separation and horizontally-separated from each other by less than a threshold horizontal separation.

In some aspects, the set of time-correlated waypoints is one of a plurality of time-correlated waypoint sets. Each of the time-correlated waypoint sets corresponds to one of the time instances specified by one or more of the waypoints in the flight information. The processing circuitry is further configured to iteratively evaluate the time-correlated waypoint sets in chronological order at least until the violation of aircraft separation requirements at the given time instance is detected.

In some aspects, to obtain the flight information comprising the plurality of waypoints for each of the plurality of aircraft flight paths, the processing circuitry is configured to predict flight trajectories from the aircraft flight paths to determine the waypoints of each of the aircraft flight paths.

In some aspects, to obtain the flight information comprising the plurality of waypoints for each of the plurality of aircraft flight paths, the processing circuitry is configured to generate one or more Extensible Markup Language (XML) documents comprising departure locations, departure times, and destination locations of the aircraft flight paths. To obtain the flight information, the processing circuitry is further configured to generate one or more Aircraft Intent Description Language (AIDL) documents based on the one or more XML documents. The one or more AIDL documents comprise trajectories of the aircraft flight paths. To obtain the flight information, the processing circuitry is further configured to generate the plurality of waypoints from the trajectories in the one or more AIDL documents. In some such aspects, the one or more XML documents further comprise initial aircraft masses, initial speeds, and cruising altitudes of the aircraft flight paths.

In some aspects, the processing circuitry is further configured to store the plurality of waypoints for each of the plurality of aircraft flight paths in a non-relational database and query the database to select the set of time-correlated waypoints from the flight information; and to select the set of altitude-correlated waypoints from the set of time-correlated waypoints. In some such aspects, to store the plurality of waypoints for each of the plurality of aircraft flight paths in the non-relational database, the processing circuitry is configured to store the plurality of waypoints in the non-relational database in chronological order.

In some aspects, the threshold vertical separation and threshold horizontal separation are in accordance with Air Traffic Control regulations corresponding to an airspace sector that comprises the first and second position-correlated waypoints.

In some aspects, the processing circuitry is further configured to generate a new flight plan to replace the aircraft flight plan corresponding to the first position-correlated waypoint or the second position-correlated waypoint; or to generate new flight plans to replace each of the aircraft flight plans corresponding to the first and second position-correlated waypoints.

Other aspects include a non-transitory computer readable medium storing a computer program product for controlling a programmable computing system. The computer program product comprises software instructions that, when executed by processing circuitry of the programmable computing system, causes the processing circuitry to obtain flight information comprising a plurality of waypoints for each of a plurality of aircraft flight paths. Each waypoint specifies an altitude, a longitudinal position, a latitudinal position, a velocity, and a time instance. The processing circuitry is further caused to detect the violation of aircraft separation requirements at a given time instance. The detecting comprises selecting a set of time-correlated waypoints from the flight information. Each time-correlated waypoint specifies the given time instance. The detecting further comprises selecting a set of altitude-correlated waypoints from the set of time-correlated waypoints. Each of the altitude-correlated waypoints are vertically-separated from at least one other altitude-correlated waypoint by less than a threshold vertical separation. The detecting further comprises determining that first and second position-correlated waypoints from the set of altitude-correlated waypoints are vertically-separated from each other by less than the threshold vertical separation and horizontally-separated from each other by less than a threshold horizontal separation.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
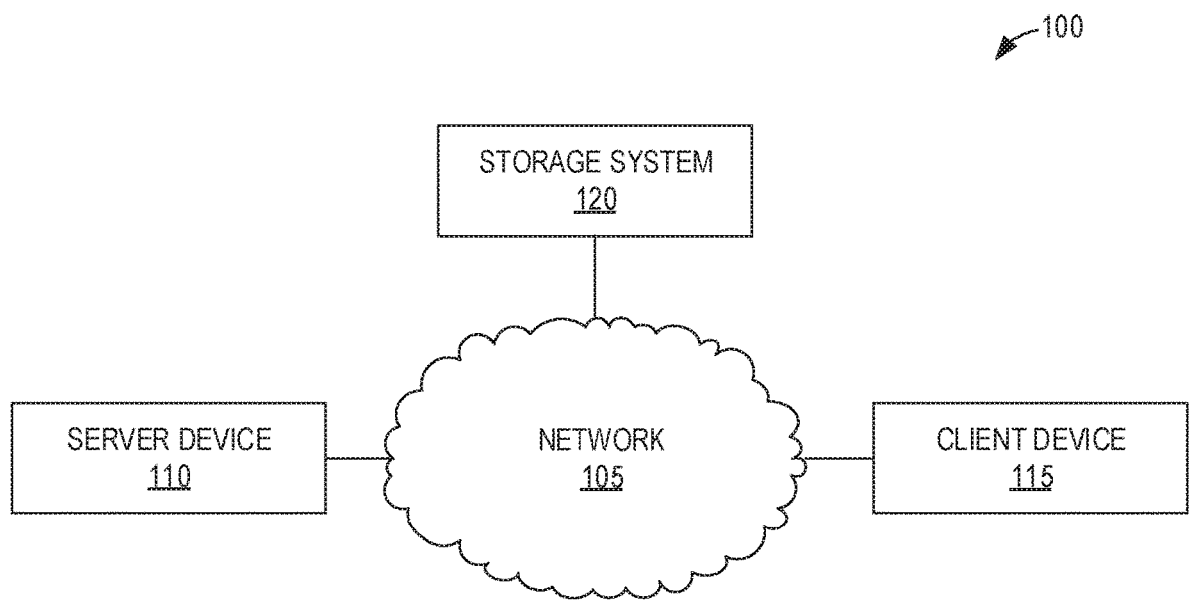

Having thus described variations of the disclosure in general terms, reference will now be made to the accompanying drawings, which are not necessarily drawn to scale, and wherein:

FIG. 1 illustrates an example computing system, according to one or more aspects of the present disclosure.

Figure 2:
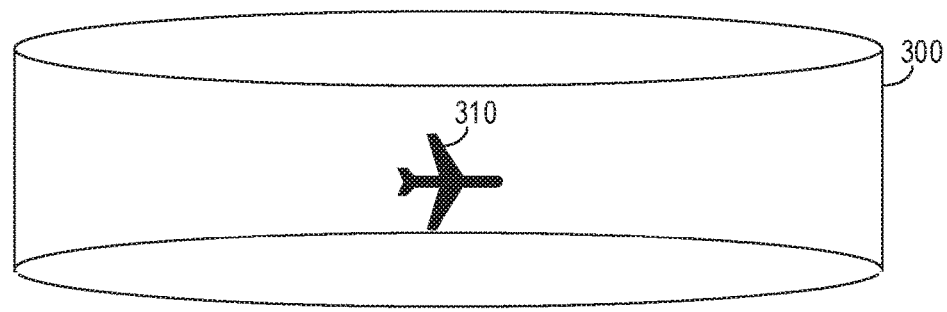

FIG. 2 illustrates an example safety area surrounding an airborne aircraft, according to one or more aspects of the present disclosure.

Figure 3:
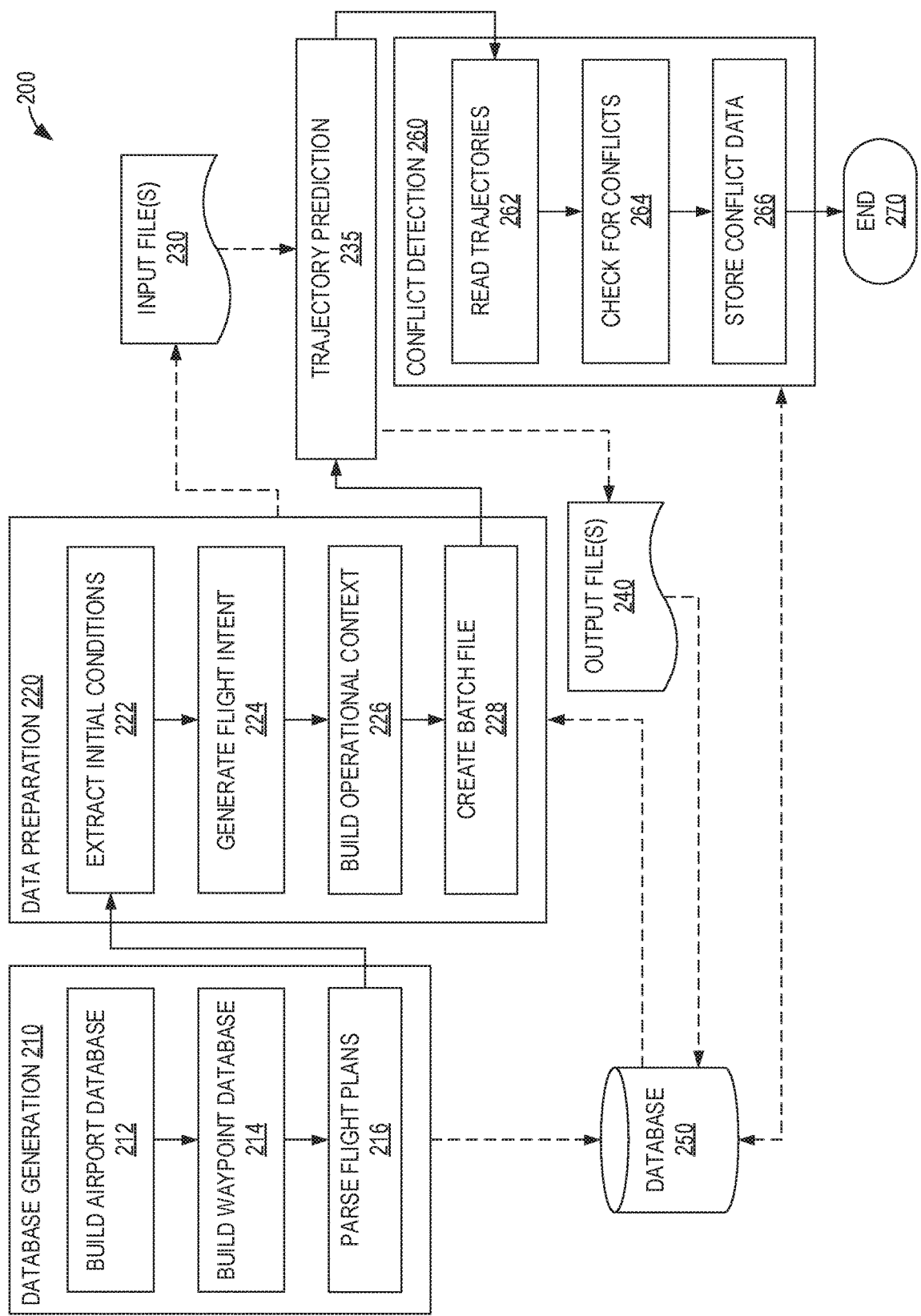

FIG. 3 illustrates an example workflow for detecting a violation of aircraft separation requirements, according to one or more aspects of the present disclosure.

FIGS. 4A-4I illustrate example database instructions, according to one or more aspects of the present disclosure.

Figure 5:
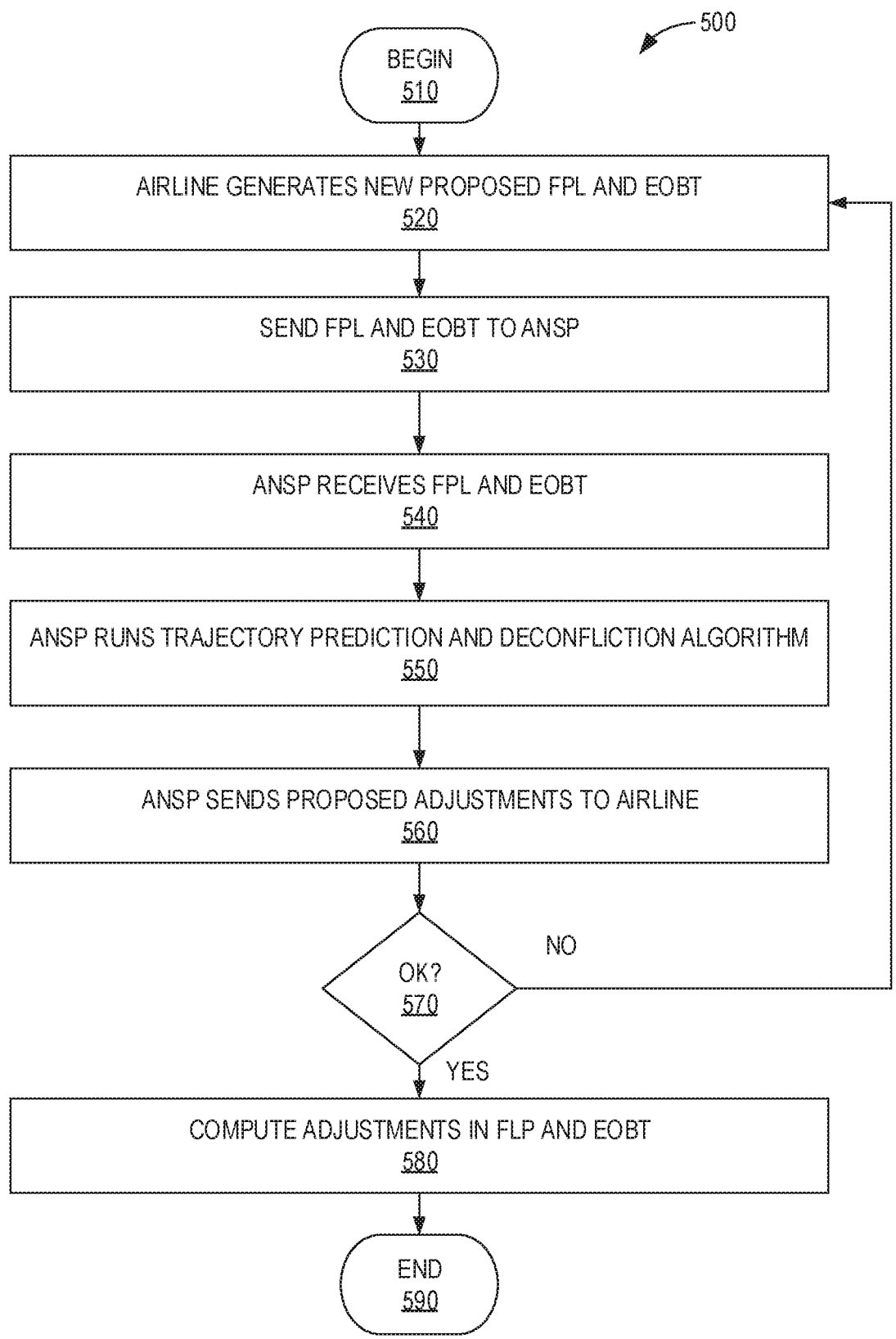

FIG. 5 is a flow diagram illustrating an example method, according to one or more aspects of the present disclosure.

Figure 6:
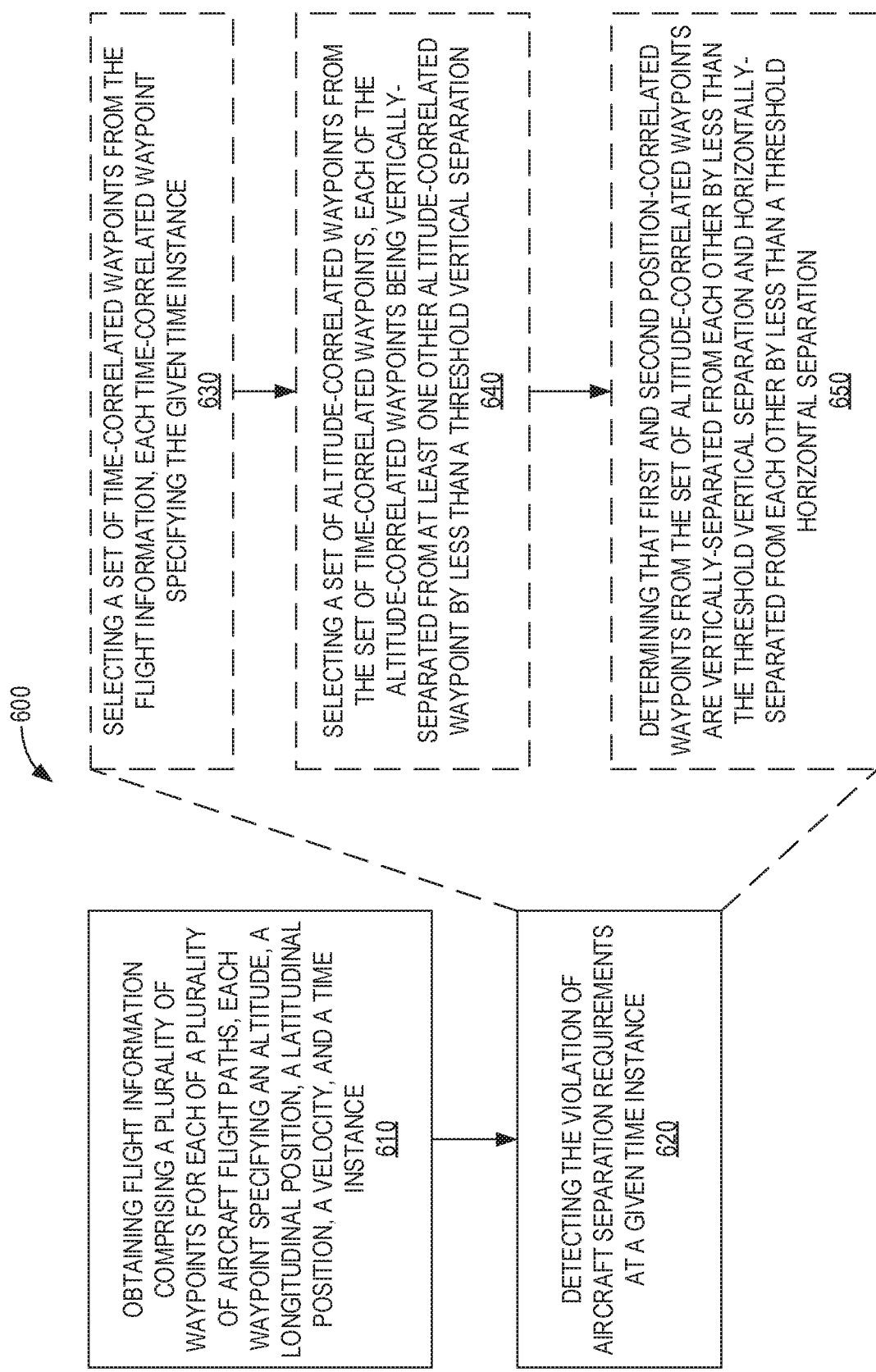

FIG. 6 is a flow diagram illustrating another example method, according to one or more aspects of the present disclosure.

Figure 7:
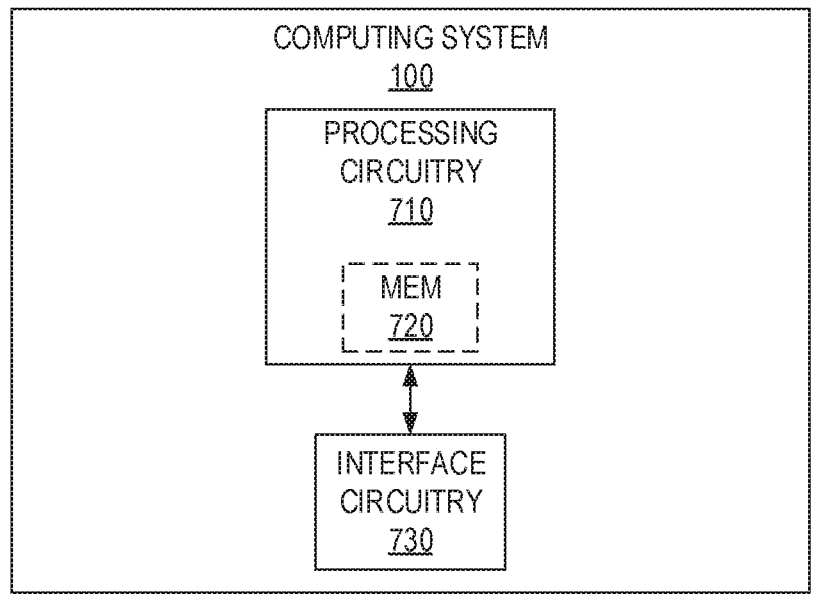

FIG. 7 is a block diagram illustrating an example computing system, according to one or more aspects of the present disclosure.

Figure 8:
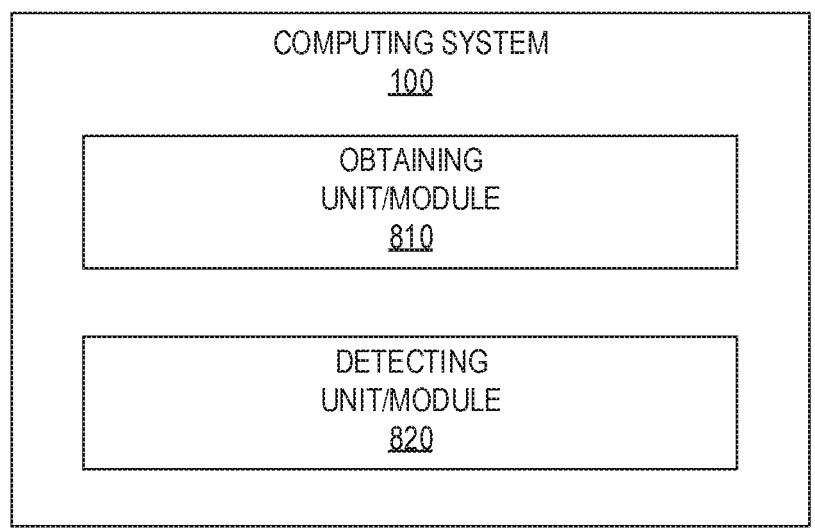

FIG. 8 is a block diagram illustrating example components of a computing system, according to one or more aspects of the present disclosure.

DETAILED DESCRIPTION

FIG. 1 illustrates an example computing system 100 that includes a plurality of networked computing devices. The computing devices include a server device 110, a client device 115, a storage system 120, and a network 105. The server device 110, client device 115, and storage system 120 are each communicatively connected to the network 105, and may thereby exchange signals with any or all of the others, depending on the particular arrangement and/or configuration of the network 105.

The client device 115 is a computing device that is configured to detect a violation of aircraft separation requirements. Typical examples of the client device 115 include a personal computer, a laptop computer, a desktop computer, a workstation, a smartphone, a tablet computer, a wearable computer, and/or a smart appliance. Other examples of the client device 115 include (but are not limited to) a server computer, a server cluster, network attached storage, and/or a storage area network (SAN).

The storage system 120 is a computing device that is configured to store flight information, as will be explained in greater detail below. Typical examples of the storage system 120 include (but are not limited to) network attached storage, a SAN, a Redundant Array of Independent Disks (RAID) array and/or a file server.

The server device 110 is a computing device that is configured to perform trajectory prediction and provide trajectory waypoint information to the storage system 120. Typical examples of the server device 110 include a server computer and/or server cluster. Less common examples of the server device 110 additionally or alternatively include (but are not limited to) a personal computer, a laptop computer, a desktop computer, and/or a workstation.

The network 105 includes one or more physical devices and/or signaling mediums carrying communication signals between the server device 110, client device 115, and/or storage system 120. Examples of such a network 105 include (but are not limited to) one or more of: the Internet (or a portion thereof); one or more local area networks; one or more wireless networks; one or more cellular networks; one or more Internet Protocol-based networks; one or more Ethernet networks; one or more optical networks; and/or one or more circuit switched networks. Such a network 105 may comprise any number of networking devices such as routers, gateways, switches, hubs, firewalls, and the like (not shown) supporting the exchange of such communication signals.

Although the example of FIG. 1 illustrates the storage system 120, server device 110, and client device 115 as separated from each other by the network 105, in some aspects of the present disclosure, one or more of such elements may be combined. Thus, the server device 110 and client device 115 may be discrete physical hardware platforms or may be the same physical hardware platform configured to perform respective server and client functions by software executing on processing circuitry comprised in the hardware platform, according to particular aspects. Further, in some aspects, the storage system 120 may be one or more hard drives and/or memory comprised within the server device 110 and/or client device 115, and the network 105 by which any such combined elements communicate may be one or more electrical buses, for example. Further details of example hardware aspects of the computing system 100 will be discussed below.

An airspace conflict is a situation in which two or more airborne aircraft violate minimum separation requirements from each other at the same time (e.g., within a given time window). The minimum separation is typically specified along both the vertical and longitudinal axes. In one particular example, the minimum vertical distance between two aircraft must be equal or greater than 1000 feet (approximately 305 meters), and the minimum longitudinal distance must be equal or greater than 5 nautical miles (9.26 km). FIG. 2 illustrates an example safety area 300 granted to aircraft 310 under particular aircraft separation requirements.

FIG. 3 illustrates an example workflow 200 for detecting a violation of aircraft separation requirements. The workflow 200 is organized into four general stages: database generation 210, data preparation 220, trajectory prediction 235, and conflict detection 260. Within FIG. 3, process flow is illustrated by solid arrows, whereas data flow is illustrated by dashed arrows. Each of the stages is a consumer and/or producer of data that is stored in and/or retrieved from database 250. Processing according to the workflow 200 may be performed by the server device 110, the client device 115, or cooperatively between the server device 110 and client device 115. The database 250 may be stored in the storage system 120. The database 250 may, in some aspects, be a non-relational database, such as a Not Only Structured Query Language (NoSQL) database. In one particular aspect, the database 250 may be a Cassandra NoSQL database.

The workflow begins in the database generation 210 stage by building an airport database (block 212) and a waypoint database (block 214). This may be done by accessing airport and corresponding waypoint data from local files. Additionally or alternatively, this data may be obtained from the client device 115. The airport waypoint data may include airport attributes such as name, location, altitude, Standard Instrument Departures (SIDs), and/or runways. In some aspects, the airport waypoint data is expressed in terms of two-dimensional location data (e.g., longitude and latitude). In other aspects, the elevation of the airport is also included. In some aspects, the airport waypoint data and names of airports is consistent with standard aeronautical charts.

Information relating to one or more Repetitive Flight Plans (RPLs) (and/or portions thereof) may also be parsed (e.g., from RPL files) (step 216) and stored in the database 250. The RPLs may include aircraft model, flight number, origin airport, destination airport, departure time, arrival time, and/or the route to be followed between origin and destination. In some aspects, the RPLs are parsed by a client application executing on the client device 115 that also stores the data they provide in the database 250.

The database generation 210 stage may be useful to populate the database 250 with static data that may be used to support the remainder of the workflow 200 and/or other future processing. Given the static nature of such data, the content of the database 250 produced by the database generation 210 stage may be useful for strategic planning.

After the database has been populated with information from the database generation 210 stage, data preparation 220 commences. In some aspects, the data preparation 220 stage (as well as the trajectory prediction 235 stage) may be performed by Trajectory Predictor software that is separate from the software that performs the database generation 210 stage, e.g., by either the client device 115 or the server device 110.

However performed, trajectory prediction 235 may use specific XML documents as input for processing, which are produced during data preparation 220. For example, one or more input files 230 may be produced during data preparation 220 in XML format that contain the initial conditions that specify the aircraft state in the beginning of the trajectory execution. Further input files 230 may include flight intent, weather model, and the operational context, i.e., characteristics of the airspace where the flight must be executed. Information about the flight plans, waypoints, and airports may be retrieved from the database 250 so each input document is appropriately fulfilled with the data available. In some aspects, the generated documents may be transferred to a shared directory and organized per aircraft 310.

In some aspects, the initial conditions of one or more flight plans are extracted and one or more input files 230 corresponding thereto are created (step 222). This document may be appropriately formatted to include, e.g., the start date and time, the origin airport, the initial aircraft mass (fuel) and the initial speed and altitude of the flight.

A flight intent document may then be generated from the flight plan (step 224). This document may feature the sequence of designated waypoints that form the desired flight path, including origin and destination airport, for example.

The operational context may then be generated (step 226). In some aspects, the operational context may be the most detailed input file used for trajectory prediction 235. For example, the operational context document may describe the origin and destination airports, the SID route to be followed, the waypoints to be reached during the cruise phase of the flight and the intended landing procedure. The specifics of aerodrome runways may also be present here.

Further files may then be created and added to the set of input files 230 used for trajectory prediction 235. These input files 230 may include the weather model (which describes the environment parameters that may affect the flight) and/or settings (which may define appropriate weights to be applied to variables for simulation of the flight trajectory). In some aspects, the input files 230 may be combined into a single document.

A batch file is then generated containing instructions to be executed in the trajectory prediction 235 for each flight (step 228). When this batch file is executed, trajectory prediction 235 is invoked for calculation of the trajectories of the flights. Accordingly, trajectory prediction 235 is modeled with motion equations for aircraft 310. Particular aircraft performance models may, e.g., be obtained from the Base of Aircraft Data (BADA), provided by EUROCONTROL.

From these inputs and aircraft models, trajectory prediction 235 yields a predicted 4D trajectory for each aircraft 310. The trajectories may be represented as sequences of waypoints that form the flight path for the aircraft 310 (i.e., with respect to the latitude, longitude, altitude and estimated time). Every waypoint may also have inherent attributes, such as speed, acceleration, and/or current mass (among others). According to one or more aspects of the present disclosure, the predicted trajectories are exported as one or more Aircraft Intent Description Language (AIDL) documents. AIDL enables interested parties to have a unified, unambiguous view on the aircraft's 310 trajectories.

As output, trajectory prediction 235 yields one or more output files 240. These output files 240 may include an aircraft intent document (expressed in AIDL) and one or more files that describe aircraft trajectories in terms of a sequence of waypoints. For example, one of the aircraft trajectory documents may describe the detailed status of the aircraft 310 at each point of its trajectory (e.g., in XML format). Another of the airport trajectory documents may be a Keyhole Markup Language (KML) formatted file which may be loaded in a graphic interface such as Google Maps.

The output trajectories in the output files 240 are parsed (e.g., by the aforementioned client application) and relevant data stored therein is recorded in the database 250. In particular, the trajectory waypoints are ordered by time and individually inserted for use in conflict detection 260. Once the database 250 is populated with the output from trajectory prediction 235 for all of the flight plans, conflict detection 260 is able to handle the complete information set concerning every flight (e.g., via the client application).

The trajectories are subsequently read out of the database 250 for conflict detection 260, e.g., by the client application (step 262). As previously discussed, many typical methodologies compare each trajectory in the full set with each other trajectory. Other typical methodologies perform interpolation of some kind among the waypoints. The present disclosure obviates these computationally intensive approaches.

For example, airspace occupation may be read from the database as ordered arrays of waypoints, and only a limited number of consecutive waypoints in the ordered arrays are evaluated against each other. In some embodiments, only those waypoints that are immediately consecutive are evaluated against each other. Thus, conflict detection 260 among two or more trajectories may be performed in linear time (step 264). Therefore, if some sampled waypoint does not conflict with its successor, then by transitivity it does not conflict with any further waypoint.

Conflicts found during conflict detection 260 are stored in the database 250 for future resolution (step 266). Data about the conflicts may comprise information about the interacting aircraft, the occurrence time, the position and/or attributes useful for heuristic analysis, including (but not limited to) priority, individual cost, and/or severity. In some aspects, once the conflicts found during conflict detection 260 have been stored in the database 250, the method ends 200 (step 270).

In one aspect, the existence of a conflict c between aircraft $A_i$ and $A_j$ at an instant t may be set forth in accordance with the logical relation expressed in Equation 1:

$$c^{A_i,A_j}(t) \Leftrightarrow (d_h^{A_i,A_j}(t) < S_h) \wedge (d_v^{A_i,A_j}(t) < S_v) \quad (1)$$

where
$d_h^{A_i,A_j}(t)$ is the longitudinal distance between $A_i$ and $A_j$ at instant t.
$d_v^{A_i,A_j}(t)$ is the vertical distance between $A_i$ and $A_j$ at instant t.
$S_h$ is the minimum required horizontal separation.
$S_v$ is the minimum required vertical separation.

To perform TBO, trajectories may be continuously recomputed using the stored reference trajectories, and the results may be electronically displayed. Thus, the computing system 100 may be a control system that follows the overall trajectory of the flights in space and time. Moreover, characteristics of the historical flight data and abstracted patterns of trajectories can be analyzed through usage of data mining algorithms. The computing system 100 may leverage a particular database structure to handle the aircraft trajectories and perform subsequent operations based on the historical trajectory data.

A non-relational database (such as a NoSQL database) is one approach to management of big data. Such a database 250 may be distributed among several nodes in a network 105. Some characteristics of NoSQL databases in particular are project simplicity, horizontal scalability, and high performance and availability. Of note, NoSQL does not conform with Atomicity, Consistency, Isolation, and Durability (ACID) principles inherent to relational databases.

Cassandra databases, in particular, are generally designed to be a peer-to-peer management system through communication among several distributed nodes in a network 105. Each node in the network 105 may have the same hierarchy and workload, and each may be able to write and read data.

Application data may be partitioned through some or all nodes in the cluster, and data replication is fairly accepted in this distributed data management system.

Unlike relational models, a data model in Cassandra does not define the concept of Entity-Relationship (ER). Instead, data is structured in columns allowing the classification of every detail of an item in a single row, indexed by its key. This implementation favors the performance of read and write operations when the intended application is to handle big data.

In a Cassandra database, data is partitioned in column families, in a similar fashion regarding ER databases. A column family is simply a collection of rows labeled by a name. Column families are logically grouped in a structure called Keyspace. Keyspaces work like an isolated scope for the names of column families. The keyspace may be any string that identifies the schema of the database 250.

Apache Cassandra (or simply Cassandra) is a NoSQL database allowing high scalability, specifically designed for big data management. Data distribution among the nodes of the network 105 is transparent to the administrator (provided that no programming effort is demanded in this task).

As any NoSQL database, Cassandra does not support ACID transactions. The standard behavior does not grant data consistency in all replicas. Rather, if at least one node owns a given data, the transaction is regarded as completed. This reduces read/write time, as such operations are extremely efficient in this architecture.

Common commands in relational data models like joins and subqueries are not allowed in Cassandra as there is no relationship among entities in Cassandra databases. Furthermore, the framework limits the WHERE clauses of queries to columns in the primary key, which demands thorough attention to the modeling of how information is stored and how information is retrieved through proper queries. The primary keys can be divided in two parts. The first part of the key is called the partition key, and the second part is called the cluster key.

The partition key is used to define the partition where the data will be based, once the data is split through nodes (e.g., in a ring topology). A hash function is applied to the keys so that the data can be efficiently stored and fetched from the indexed node. The cluster key univocally identifies a row within a partition. Therefore, a choice of good primary keys is generally important for adequate modeling.

A Cassandra database generally has a flexible design structure which makes it suitable for conflict detection in 4D trajectories. Queries that may be desirable, according to various aspects, may include the attributes of aircraft, trajectory of aircraft, points in a trajectory, data about used airports (such as SIDs and Standard Terminal Arrival Routes (STARs)), and/or points occupied at time t.

Accordingly, a Cassandra keyspace may be created to accommodate data about the information above. In one example, the keyspace may be named kp_traptest. In some aspects, the whole database 250 may be kept in a single node. In other aspects, the database 250 may be distributed across a cluster topology.

The database 250 may be created using the example creation script instruction shown in FIG. 4A. The first column family may be created in order to hold the data about the flight intent of the aircraft 310. Although FIG. 4A illustrates very particular parameters, in general, the particular parameter names and types may vary as appropriate and/or according to user preferences. For example, aspects of the present disclosure may use a different instruction than the example illustrated in FIG. 4A that specifies a different keyspace, as may be desired by a user.

The flight plans may be parsed and inserted into the table flightPlan, which may be created using the example instructions shown in FIG. 4B, for example. An index may be created on the flight number, which allows the fetch requests to be performed by adding the column flightNum as a parameter to the WHERE clause. In some aspects, the departure airport should also be specified.

Trajectory prediction 235 may calculate trajectories described in AIDL and generate a KML file as output. This file uses XML a syntax to represent each sample point in a 4D trajectory. Thus, the sample point attributes (x, y, h, t) of a predicted trajectory may be used as input for conflict detection 260. A table from which the aircraft trajectory can be fetched may thus be created using the sample instruction of FIG. 4C. According to the example of FIG. 4C, this table is called acTrajectory. The partition key is the flight number. A clustering order on the column time is applied so that the trajectory waypoints are ordered by their time in ascending order.

This column family may be queried to bring the whole set of ordered waypoints that form an aircraft's trajectory, but it is ineffective if one desires to fetch the instant airspace occupation at a given time. Accordingly, a further table may be created, e.g., using the example instruction of FIG. 4D. According to the example of FIG. 4D, this table is called pointsByTime. This table has as partition key the composed key (hour, minute), which represents a timestamp with precision in minutes, and the clustering keys are the time with precision in seconds and the altitude. Thus, the table created as a result of executing the instruction in FIG. 4D stores every sampled point of each aircraft trajectory, partitioned by their timestamp. This column family aggregates the airspace occupation during a given period (e.g., a whole operational day).

Significantly, because the model design discussed above grants that every waypoint is ordered, evaluation for conflict detection 260 between two waypoints may be accomplished by comparing only neighboring waypoint entries in the fetch result.

Yet another table may be created to hold fixed waypoints along predefined routes. Such a table may, for example, be called waypoints, which may be created using the example instruction found in FIG. 4E. Only the partition key is defined, so that a fix point can be fetched by its name.

A similar table called airports may also be created to hold important information concerning the airport location, e.g., using the instruction shown in FIG. 4F. According to this example, the primary key is the International Air Transport Association (IATA) identifier of each airport.

The runways present in the simulated airports are stored in table runways, and the SID routes for every airport are managed by table SIDs, which is a collection of points that constitute the departure route. Example instructions for creating the runway table and SID table are illustrated in FIGS. 4G and 4H, respectively.

Information about detected conflicts may also be stored in a table. An example instruction for creating such a table is illustrated in FIG. 4I. According to this example, more than the 4D attributes that define a conflict is stored. In particular, further information is added to the conflict parameters, which may be used as variables to define heuristics for conflict resolution.

According to particular aspects, the client application discussed above may be implemented in Java. Among other things, the client application may be responsible for parsing the flight plans, known points for SIDs, STARs, fixed points along the route, and/or airport data, and consolidate this data in the database 250. From the database 250, flight information may be extracted in order to generate the input files for trajectory prediction 235, and a shell command file generated with appropriate commands to be executed for each aircraft 310 subject to analysis.

After trajectory prediction 235 is performed, the client application may collect the trajectory output (e.g., from output files 240) and insert the corresponding data into the database 250. Once the database 250 is populated with static data, flight plans may be fetched and submitted to the engine that generates the input files for trajectory prediction 235. Then, the batch script executes the trajectory prediction for each flight, and the client application accesses the output trajectories and inserts all of the sampled waypoints into the database. Finally, conflict detection 260 is triggered and any conflicts found are inserted into the database 250 as well.

Aspects of the workflow 200 discussed above may be used in Air Navigation Service Provider (ANSP) solutions applicable to the flight plan submission and authorization process (pre-tactical scope) during an airline's dispatch cycle (e.g., up to 2 hours before takeoff) as shown in the example process 500 illustrated in FIG. 5. Such a process may provide airline dispatch and an ANSP with an accurate estimate of the departure time (e.g., within 5 minutes tolerance) and intended speed and altitude to be developed by the aircraft in order to achieve an effective airspace capacity configuration.

To begin the process 500 (step 510), airline dispatch generates a new proposed flight plan (FPL) and estimated off-block time (EOBT) (step 520). The airline then sends the proposed FPL (e.g., which may comprise the EOBT, as shown) to the ANSP (step 530). The ANSP receives the FPL and EOBT (step 540) and runs trajectory prediction 235 and a deconfliction algorithm that includes conflict detection 260, as discussed above (step 550). The ANSP sends proposed adjustments to the airline (step 560). Such adjustments may include, for example, adjustments to the EOBT, speed, and/or altitude, among other things. If the adjustments are not acceptable (step 570, no), the airline generates another proposed FPL and EOBT for consideration by the ANSP (step 520). If the adjustments are acceptable (step 570, yes), airline dispatch computes the adjustments in FPL and EOBT (step 580) and the process 500 ends (step 590).

In view of all of the above, FIG. 6 illustrates an example method 600 of detecting a violation of aircraft separation requirements, according to one or more aspects of the present disclosure. The method 600 is implemented by a computing system 100 and comprises obtaining flight information comprising a plurality of waypoints for each of a plurality of aircraft flight paths (block 610). Each waypoint specifies an altitude, a longitudinal position, a latitudinal position, a velocity, and a time instance. The method 600 further comprises detecting the violation of aircraft separation requirements at a given time instance (block 620).

In some aspects, the detecting comprises selecting a set of time-correlated waypoints from the flight information (block 630). Each time-correlated waypoint specifies the given time instance. The detecting further comprises selecting a set of altitude-correlated waypoints from the set of time-correlated waypoints (block 640). Each of the altitude-correlated waypoints is vertically-separated from at least one other altitude-correlated waypoint by less than a threshold vertical separation. The detecting further comprises determining that first and second position-correlated waypoints from the set of altitude-correlated waypoints are vertically-separated from each other by less than the threshold vertical separation and horizontally-separated from each other by less than a threshold horizontal separation (block 650). Indeed, various aspects may include evaluating any number of conflicts, e.g., based on the waypoints comprised in the set of time-correlated waypoints and/or altitude-correlated waypoints.

Other embodiments of the present disclosure include the computing system 100 implemented according to the hardware illustrated in FIG. 7. The example hardware of FIG. 7 comprises processing circuitry 710 and interface circuitry 730. The processing circuitry 710 is communicatively coupled to the interface circuitry 730, e.g., via one or more buses. The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing software instructions stored, e.g., as a machine-readable computer program in memory circuitry 720. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 730 may be a controller hub configured to control the input and output (I/O) data paths of the computing system 100. Such I/O data paths may include data paths for exchanging signals over a network 105 and data paths for exchanging signals with a user. For example, the interface circuitry 730 may comprise a transceiver configured to send and receive communication signals over one or more of a cellular network, Ethernet network, or optical network, e.g., between a server device 110, client device 115, and/or storage system 120 of the computing system 100. The interface circuitry 730 may also comprise one or more of a graphics adapter, display port, video bus, touchscreen, graphical processing unit (GPU), display port, Liquid Crystal Display (LCD), and Light Emitting Diode (LED) display, for presenting visual information to a user. The interface circuitry 730 may also comprise one or more of a pointing device (e.g., a mouse, stylus, touchpad, trackball, pointing stick, joystick), touchscreen, microphone for speech input, optical sensor for optical recognition of gestures, and keyboard for text entry.

The interface circuitry 730 may be implemented as a unitary physical component, or as a plurality of physical components that are contiguously or separately arranged, any of which may be communicatively coupled to any other, or may communicate with any other via the processing circuitry 710. For example, the interface circuitry 730 may comprise output circuitry (e.g., transmitter circuitry configured to send communication signals over the network 105) and input circuitry (e.g., receiver circuitry configured to receive communication signals over the network 105). Similarly, the output circuitry may comprise a display, whereas the input circuitry may comprise a keyboard. Other examples, permutations, and arrangements of the above and their equivalents will be readily apparent to those of ordinary skill.

According to one or more aspects of the hardware illustrated in FIG. 7, the processing circuitry 710 is configured to obtain flight information comprising a plurality of waypoints for each of a plurality of aircraft flight paths via the interface circuitry 730. Each waypoint specifies an altitude, a longitudinal position, a latitudinal position, a velocity, and a time instance. The processing circuitry 710 is further configured to detect the violation of aircraft separation requirements at a given time instance.

In some such aspects, to detect the violation of aircraft separation requirements the processing circuitry 710 is configured to select a set of time-correlated waypoints from the flight information. Each time-correlated waypoint specifies the given time instance. The processing circuitry 710 is further configured to select a set of altitude-correlated waypoints from the set of time-correlated waypoints. Each of the altitude-correlated waypoints is vertically-separated from at least one other altitude-correlated waypoint by less than a threshold vertical separation. The processing circuitry 710 is further configured to determine that first and second position-correlated waypoints from the set of altitude-correlated waypoints are vertically-separated from each other by less than the threshold vertical separation and horizontally-separated from each other by less than a threshold horizontal separation.

Other embodiments of the present disclosure include the computing system 100 as illustrated in FIG. 8. The computing system 100 comprises a plurality of communicatively coupled physical units and/or functional modules. In particular, the computing system 100 comprises an obtaining unit or module 810 and a detecting unit or module 820. The obtaining unit or module 810 is configured to obtain flight information comprising a plurality of waypoints for each of a plurality of aircraft flight paths. Each waypoint specifies an altitude, a longitudinal position, a latitudinal position, a velocity, and a time instance. The detecting unit or module 820 is further configured to detect the violation of aircraft separation requirements at a given time instance, e.g., by performing steps 630, 640, and 650 of the method 600 illustrated in FIG. 6.

The various methods and processes described herein may be implemented using various hardware configurations. Examples of such configurations include one or more distributed systems, one or more virtual systems, a consolidated system, a cluster-based system, and/or a client-server system. Particular hardware configurations generally, but not necessarily, include the use of one or more microprocessors, microcontrollers, digital signal processors, or the like, coupled to memory storing software instructions or data for carrying out the techniques described herein. In particular, the circuits of various embodiments may be configured in ways that vary in certain details from the broad descriptions given above. For instance, one or more of the processing functionalities discussed above may be implemented using dedicated hardware, rather than a microprocessor configured with program instructions. Since the design and cost tradeoffs for the various hardware approaches may depend on system-level requirements that are outside the scope of the present disclosure, further details of specific hardware implementations are not provided herein.

Embodiments of the present disclosure may additionally or alternatively include one or more compatible combinations of features described herein. The present invention may, of course, be carried out in other ways than those specifically set forth herein without departing from essential characteristics of the invention. The embodiments described herein are to be considered in all respects as illustrative and not restrictive, and all changes coming within the meaning and equivalency range of the appended claims are intended to be embraced therein.

For example, although steps of various processes or methods described herein may be shown and described as being in a sequence or temporal order, the steps of any such processes or methods are not limited to being carried out in a particular sequence or order, absent an indication otherwise. Indeed, the steps in such processes or methods generally may be carried out in various different sequences and orders while still falling within the scope of the present invention.

What is claimed is:

1. A method of detecting a violation of aircraft separation requirements, implemented by a computing system, the method comprising:
   obtaining flight information comprising a plurality of waypoints for each of a plurality of aircraft flight paths, each waypoint specifying an altitude, a longitudinal position, a latitudinal position, a velocity, and a time instance;
   detecting the violation of aircraft separation requirements at a given time instance, the detecting comprising:
   selecting a set of time-correlated waypoints from the flight information, each time-correlated waypoint specifying the given time instance;
   selecting a set of altitude-correlated waypoints from the set of time-correlated waypoints, each of the altitude-correlated waypoints being vertically-separated from at least one other altitude-correlated waypoint by less than a threshold vertical separation; and
   determining that first and second position-correlated waypoints from the set of altitude-correlated waypoints are vertically-separated from each other by less than the threshold vertical separation and horizontally-separated from each other by less than a threshold horizontal separation.

2. The method of claim 1, wherein the set of time-correlated waypoints is one of a plurality of time-correlated waypoint sets, each of the time-correlated waypoint sets corresponding to one of the time instances specified by one or more of the waypoints in the flight information, the method further comprising iteratively evaluating the time-correlated waypoint sets in chronological order at least until the violation of aircraft separation requirements at the given time instance is detected.

3. The method of claim 1, wherein obtaining the flight information comprising the plurality of waypoints for each of the plurality of aircraft flight paths comprises predicting flight trajectories from the aircraft flight paths to determine the waypoints of each of the aircraft flight paths.

4. The method of claim 1, wherein obtaining the flight information comprising the plurality of waypoints for each of the plurality of aircraft flight paths comprises:
   generating one or more Extensible Markup Language (XML) documents comprising departure locations, departure times, and destination locations of the aircraft flight paths;
   generating one or more Aircraft Intent Description Language (AIDL) documents based on the one or more XML documents, the one or more AIDL documents comprising trajectories of the aircraft flight paths; and
   generating the plurality of waypoints from the trajectories in the one or more AIDL documents.

5. The method of claim 4, wherein the one or more XML documents further comprise initial aircraft masses, initial speeds, and cruising altitudes of the aircraft flight paths.

6. The method of claim 1, further comprising storing the plurality of waypoints for each of the plurality of aircraft flight paths in a non-relational database and querying the database to:
   select the set of time-correlated waypoints from the flight information; and
   select the set of altitude-correlated waypoints from the set of time-correlated waypoints.

7. The method of claim 6, wherein storing the plurality of waypoints for each of the plurality of aircraft flight paths in the non-relational database comprises storing the plurality of waypoints in the non-relational database in chronological order.

8. The method of claim 1, wherein the threshold vertical separation and threshold horizontal separation are in accordance with Air Traffic Control regulations corresponding to an airspace sector that comprises the first and second position-correlated waypoints.

9. The method of claim 1, further comprising:
   generating a new flight plan to replace the aircraft flight plan corresponding to the first position-correlated waypoint or the second position-correlated waypoint; or
   generating new flight plans to replace each of the aircraft flight plans corresponding to the first and second position-correlated waypoints.

10. A computing system for detecting a violation of aircraft separation requirements, the computing system comprising:
   interface circuitry and processing circuitry, wherein the processing circuitry is communicatively coupled to the interface circuitry and configured to:
      obtain flight information comprising a plurality of waypoints for each of a plurality of aircraft flight paths via the interface circuitry, each waypoint specifying an altitude, a longitudinal position, a latitudinal position, a velocity, and a time instance;
      detect the violation of aircraft separation requirements at a given time instance, wherein to detect the violation of aircraft separation requirements the processing circuitry is configured to:
         select a set of time-correlated waypoints from the flight information, each time-correlated waypoint specifying the given time instance;
         select a set of altitude-correlated waypoints from the set of time-correlated waypoints, each of the altitude-correlated waypoints being vertically-separated from at least one other altitude-correlated waypoint by less than a threshold vertical separation; and
         determine that first and second position-correlated waypoints from the set of altitude-correlated waypoints are vertically-separated from each other by less than the threshold vertical separation and horizontally-separated from each other by less than a threshold horizontal separation.

11. The computing system of claim 10, wherein the set of time-correlated waypoints is one of a plurality of time-correlated waypoint sets, each of the time-correlated waypoint sets corresponding to one of the time instances specified by one or more of the waypoints in the flight information, wherein the processing circuitry is further configured to iteratively evaluate the time-correlated waypoint sets in chronological order at least until the violation of aircraft separation requirements at the given time instance is detected.

12. The computing system of claim 10, wherein to obtain the flight information comprising the plurality of waypoints for each of the plurality of aircraft flight paths, the processing circuitry is configured to predict flight trajectories from the aircraft flight paths to determine the waypoints of each of the aircraft flight paths.

13. The computing system of claim 10, wherein to obtain the flight information comprising the plurality of waypoints for each of the plurality of aircraft flight paths, the processing circuitry is configured to:
   generate one or more Extensible Markup Language (XML) documents comprising departure locations, departure times, and destination locations of the aircraft flight paths;
   generate one or more Aircraft Intent Description Language (AIDL) documents based on the one or more XML documents, the one or more AIDL documents comprising trajectories of the aircraft flight paths; and
   generate the plurality of waypoints from the trajectories in the one or more AIDL documents.

14. The computing system of claim 13, wherein the one or more XML documents further comprises initial aircraft masses, initial speeds, and cruising altitudes of the aircraft flight paths.

15. The computing system of claim 10, wherein the processing circuitry is further configured to store the plurality of waypoints for each of the plurality of aircraft flight paths in a non-relational database and query the database to:
   select the set of time-correlated waypoints from the flight information; and
   select the set of altitude-correlated waypoints from the set of time-correlated waypoints.

16. The computing system of claim 15, wherein to store the plurality of waypoints for each of the plurality of aircraft flight paths in the non-relational database, the processing circuitry is configured to store the plurality of waypoints in the non-relational database in chronological order.

17. The computing system of claim 10, wherein the threshold vertical separation and threshold horizontal separation are in accordance with Air Traffic Control regulations corresponding to an airspace sector that comprises the first and second position-correlated waypoints.

18. The computing system of claim 10, wherein the processing circuitry is further configured to:
   generate a new flight plan to replace the aircraft flight plan corresponding to the first position-correlated waypoint or the second position-correlated waypoint; or
   generate new flight plans to replace each of the aircraft flight plans corresponding to the first and second position-correlated waypoints.

19. A non-transitory computer readable medium storing a computer program product for controlling a programmable computing system, the computer program product comprising software instructions that, when executed by processing circuitry of the programmable computing system, causes the processing circuitry to:
   obtain flight information comprising a plurality of waypoints for each of a plurality of aircraft flight paths, each waypoint specifying an altitude, a longitudinal position, a latitudinal position, a velocity, and a time instance;
   detect the violation of aircraft separation requirements at a given time instance, the detecting comprising:
      selecting a set of time-correlated waypoints from the flight information, each time-correlated waypoint specifying the given time instance;
      selecting a set of altitude-correlated waypoints from the set of time-correlated waypoints, each of the altitude-correlated waypoints being vertically-separated from at least one other altitude-correlated waypoint by less than a threshold vertical separation; and determining that first and second position-correlated waypoints from the set of altitude-correlated waypoints are vertically-separated from each other by less than the threshold vertical separation and horizontally-separated from each other by less than a threshold horizontal separation.

20. The non-transitory computer readable medium of claim 19, wherein the set of time-correlated waypoints is one of a plurality of time-correlated waypoint sets, each of the time-correlated waypoint sets corresponding to one of the time instances specified by one or more of the waypoints in the flight information, wherein the processing circuitry is further caused to iteratively evaluate the time-correlated waypoint sets in chronological order at least until the violation of aircraft separation requirements at the given time instance is detected.

* * * * *